Figure 1:
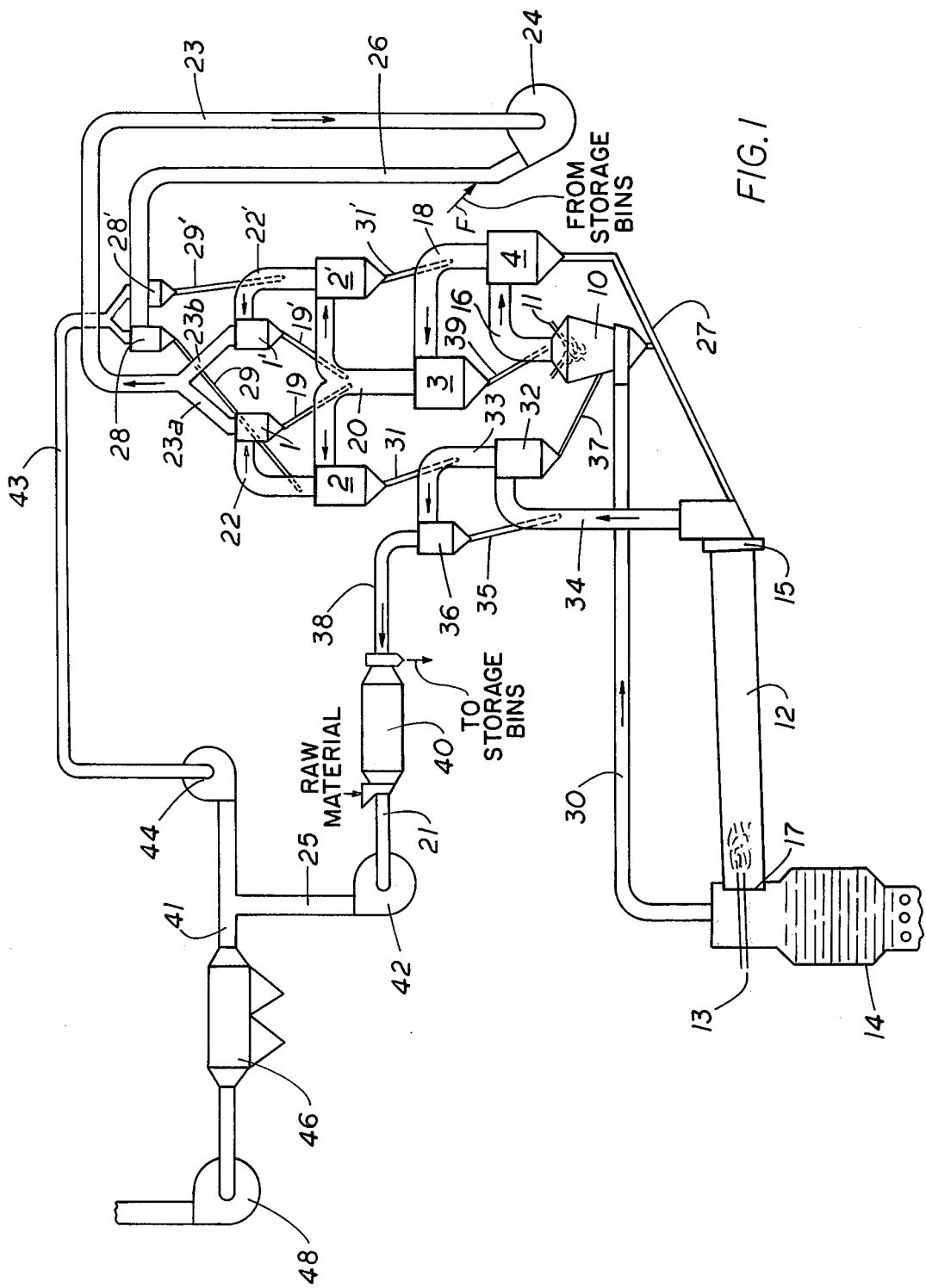

United States Patent [19]

Ghestem

[11] 4,071,310
[45] Jan. 31, 1978

[54] INSTALLATION FOR THE MANUFACTURE OF CEMENT

[75] Inventor: Gérard Ghestem, Lambersart, France

[73] Assignee: Fives-Cail Babcock, Paris, France

[21] Appl. No.: 735,908

[22] Filed: Oct. 26, 1976

[30] Foreign Application Priority Data

Oct. 28, 1975 France .................................. 75 32852
Aug. 2, 1976 France .................................. 76 23533

[51] Int. Cl.² ............................................. F27B 7/02
[52] U.S. Cl. .................................... 432/106; 432/14; 106/100
[58] Field of Search ........................... 432/14–16, 432/103, 105, 106, 58; 34/57 R, 35, 57 A, 86, 57 E; 106/100, 103

[56] References Cited

U.S. PATENT DOCUMENTS

| 2,663,560 | 12/1953 | Muller et al. | 432/14 |
| 3,452,968 | 7/1969 | Shimizu et al. | 432/106 |
| 3,836,323 | 9/1974 | Engel | 432/106 |
| 3,864,075 | 2/1975 | Christiansen | 432/106 |
| 3,881,861 | 5/1975 | Ritzmann | 432/106 |
| 3,938,949 | 2/1976 | Christiansen | 432/106 |
| 3,955,917 | 5/1976 | Kratochvil | 432/106 |
| 4,004,876 | 1/1977 | Sylvest | 432/105 |

FOREIGN PATENT DOCUMENTS

2,523,737 12/1975 Germany .............................. 432/106

Primary Examiner—John J. Camby
Assistant Examiner—Henry C. Yuen
Attorney, Agent, or Firm—Kurt Kelman

[57] ABSTRACT

An installation for the manufacture of cement in a rotary tubular kiln comprises a combustion chamber upstream of the kiln, two preheaters for the raw material, one of the preheaters receiving hot gases from the kiln and the other preheater receiving combustion gases from the combustion chamber, and a cooler receiving the clinker from the kiln. One of the preheaters is a multi-stage preheater and all of the raw material is introduced into the one preheater one of whose stages is arranged to divide the raw material into two fractions. One of the raw material fractions is passed sequentially into the other preheater and into the combustion chamber while the other fraction is passed sequentially into the other stages of the one preheater and into the combustion chamber.

6 Claims, 5 Drawing Figures

INSTALLATION FOR THE MANUFACTURE OF CEMENT

The present invention relates to improvements in an installation for the manufacture of cement from dry raw material.

Installations of this type may comprise a rotary tubular kiln having an inlet for the dry raw material, means for producing hot gases in the kiln for converting the raw material into clinker, an outlet for the clinker, and flue means for removing the hot gases from the kiln. It has also been proposed to dispose a chamber of cumbustion upstream of the kiln inlet in such an installation, the combustion chamber having means for producing combustion gases in the chamber and flue means for removing the combustion gases from the chamber. In this type of installation, it has been proposed to heat a portion of the raw material in a first preheater heated by the hot gases from the kiln and another raw material portion in a second preheater heated by the combustion gases before these raw material portions are introduced first into the combustion chamber and then into the kiln. A cooler receives the clinker from the outlet of the kiln for cooling the clinker.

In such installations, the gases exhausted from the preheaters may be delivered to a boiler where a portion of their heat may be utilized to produce steam. While this improves the thermal efficiency of the installation by recovering at least some of the calories of the exhausted gases for useful purposes, it involves additional investment costs and relatively high maintenance costs.

It has also been proposed to utilize the heat of the gases exhausted from one of the preheaters for heating the secondary air delivered to the combustion chamber. This requires an air heater with indirect heat exchange and, furthermore, is of interest only if means, such as a boiler, are also provided for recovering the calories of the cooling air coming from the clinker cooler, which again involves additional investment and maintenance costs.

It is the primary object of this invention to reduce the caloric consumption of cement manufacturing installations of the above-indicated type by better recovery of the heat of the exhausted gases without requiring special gas recovery apparatus.

The above and other objects are accomplished in accordance with the invention by placing a first preheater for the raw material in communication with flue means for removing the hot gases from the kiln whereby the hot gases pass through the first preheater, a second preheater in communication with flue means for removing the combustion gases from the combustion chamber whereby the combustion gases pass through the second preheater, one of the preheaters being a multi-stage preheater and all of the raw material being introduced into the one preheater, and one of the stages of the multi-stage preheater being arranged to divide the raw material into two fractions. Conduit means pass one of the raw material fractions sequentially into the other preheater and into the chamber of combustion while passing the other raw material fraction sequentially into the other stages of the one preheater and into the chamber of combustion.

The gases exhausted from the other preheater, which receives the previously heated raw material fraction, may be used to dry the raw material when it is desired to effectuate the drying at a high temperature and with a relatively small amount of gases. In this case, it is advantageous to use the gases exhausted from the one preheater for pneumatically entraining the raw material to the one preheater.

It is also possible to use all the gases exhausted from both preheaters for drying the raw material when drying is to be effected at a low temperature and with relatively large amounts of gas. In this case, the gases exhausted from the one preheater are sucked into by a first ventilator with the hotter gases exhausted from the other preheater. A second ventilator then sucks in all the exhausted gases after they have been mixed. This makes it possible to permit the two ventilators to operate at a low loss of charge and at low temperature. This arrangement is also of interest when there is no need for drying the raw material and the exhausted gases are to be passed through a reconditioning circuit before they are conducted into an electro-filter.

It is useful to remove the air which is conducted as secondary air to the combustion chamber from the cooler at a temperature of the order of about 900° C to 1000° C. When the cooler is of the tank-type through which the cooling air passes countercurrently to the delivery of the clinker, all of the cooling air is advantageously used as secondary air for the combustion chamber and the kiln.

The above and other objects, advantages and features of the present invention will become more apparent from the following detailed description of now preferred embodiments thereof, taken in conjunction with the accompanying drawing wherein FIGS. 1 to 5 schematically show five embodiments of an installation for the manufacture of cement according to this invention.

Referring now to the drawing, wherein like reference numerals designate like parts functioning in a like manner in all figures, the installation is shown to comprise rotary tubular kiln 12 which has inlet 15 for the dry raw material, outlet 17 for the clinker produced in the kiln by the action of hot gases converting the raw material into clinker, the hot gases being generated in the kiln by burner 13, and flue 34 for removing the hot gases from the kiln. The installation also comprises cooler 14 for the hot clinker, the cooler receiving the clinker from kiln outlet 17 with which it is in communication, and a delivery circuit for the raw material, the delivery circuit including two preheaters from which preheated raw material is delivered to kiln inlet 15. One of the preheaters is a multi-stage preheater. The illustrated preheaters are comprised of a series of cyclones.

In the embodiment of FIG. 1, the first preheater is a four-stage preheater whose first two stages are each comprised of a pair of cyclones 1, 1' and 2, 2' while the third and fourth stages of the first preheater are single cyclones 3 and 4. Combustion chamber 10 is mounted in the delivery circuit for the raw material upstream of kiln inlet 15. Flue 30 feeds a fraction of the air used to cool the clinker as secondary air from clinker cooler 14 to the combustion chamber, this air fraction having a temperature of the order of about 900° C to 1000° C when removed from the cooler, and a combustible material is injected into chamber 10 by nozzles 11 for producing hot combustion gases. Another fraction of the cooling air is fed into the kiln to serve as secondary air.

A circuit of flues connects the combustion gas outlet of chamber 10 to the first preheater to deliver the hot combustion gases from the chamber into the preheater. This circuit of flues comprises flue 16 connecting the gas outlet of chamber 10 to fourth-stage cyclone 4 whence flue 18 leads to third-stage cyclone 3. Flue 20 is connected to the gas outlet of cyclone 3 and has two branches leading, respectively, to second-stage twin cyclones 2, 2' whence flues 22, 22' lead to first-stage twin cyclones 1, 1'. Flues 23a, 23b lead from cyclones 1, 1' into exhaust flue 23 which is connected to the suction input of ventilator 24 whereby the combustion gases from chamber of combustion 10 are sucked through the circuit of flues 16, 18, 20, 22 and 23 of the first preheater, the four stages of this preheater being connected to each other in series while the cyclones of the first and second stages thereof are connected in parallel. In this manner, the hot combustion gases pass successively from the fourth to the first preheater stage of the first preheater.

The second preheater comprises cyclones 32 and 36 connected in series. Flue 34 connects the top of the smokestack leading from the kiln to cyclone 32 to deliver the hot gases removed from kiln 12 thereto and the gas outlet of cyclone 32 is connected to cyclone 36 of the second preheater to deliver the hot gases from cyclone 32 to cyclone 36. The gas outlet of cyclone 36 is connected by exhaust pipe 38 to drier 40 used to dry raw material by the hot gases flowing therethrough, the drier being connected by pipe 21 to the suction input of ventilator 42 whereby the hot gases from kiln 12 are sucked through the circuit of flues 34, 33, 38 and 21. The pressure outlet of ventilator 42 is connected by conduit 25 to conduit 41. Electro-filter 46 is incorporated in conduit 41 which leads to the suction input of exhaust fan 48 and the filter removes dust from the exhaust fumes which are ejected into the atmosphere by the pressure output of fan 48.

The delivery circuit for feeding the raw material through the preheaters to the kiln comprises upstream conduit portion 26 having one end connected to the pressure output of ventilator 24, the gas flow from the first preheater being delivered thereby to entrain raw material fed into conduit portion 26 at F and transport the raw material pneumatically into twin cyclones 28, 28'. In these cyclones, the raw material is separated from the gas which is exhausted from cyclones 28, 28' through exhaust pipe 43 connected to the suction input of ventilator 44 whose pressure output is connected to conduit 41 leading to exhaust fan 48.

The delivery circuit further comprises twin conduits 29, 29' delivering the separated raw material from cyclones 28, 28' into flues 22, 22' where some of it is entrained by the gases flowing in these flues into twin cyclones 1, 1' of the first preheater. There, the raw material is again separated from the gases and delivered through twin conduits 19, 19' into the branches of flue 20 where the flowing gases carry some of the raw material into twin cyclones 2, 2'. Again, the raw material is separated from the gases in the cyclones and the separated raw material from cyclone 2 is fed into flue 33 by conduit 31 while it is fed from cyclone 2' into flue 18 by conduit 31'. The gases flowing in these flues carry some of the raw material respectively into cyclone 36 of the second preheater and cyclone 3 of the first preheater. The raw materials separated in these cyclones are delivered, respectively, into flue 34 by conduit 35 and by conduit 39 into chamber of combustion 10. The raw material delivered into flue 34 will be moved into cyclone 32 of the second preheater. The raw material separated in cyclone 32 will be fed by gravity into chamber of combustion 10. The raw material delivered by conduit 39 of the first preheater will be fed by gravity into chamber of combustion 10. Any raw material delivered into chamber of combustion 10 by conduits 37 and 39 will be moved through flue 16 into cyclone 4 of the first preheater. Then the portion of the raw material separated in cyclone 2 of the first preheater will pass through second preheater cyclones 32 and 36 where it will be in countercurrent contact with the hot gases coming from kiln 12 before entering chamber of combustion 10. The hot gases exhausted from the second preheater are used to dry raw material in an apparatus 40, such as a drier or a ball mill. The material separated in cyclone 4 of the first preheater will be delivered from the cyclone into kiln inlet 15 by conduit 27. An outlet of combustion chamber 10 is also connected to conduit 27 for feeding into the kiln the conglomerates of raw material which cannot be carried out of the chamber by the current of gases.

This disposition of the gas flue and raw material delivery circuits makes it possible to use gases at high temperature for drying and preheating the raw material before it enters the kiln and, therefore, to use a smaller gas throughput than used in conventional installations of this type. The thermal yield of the operation is much better and it is not necessary to increase the dimensions of the drying apparatus to obtain acceptable gas velocities. For example, in an installation of the type described hereinabove and shown in FIG. 1, gases leaving cyclone 36 of the second preheater enter drier 40 at a temperature of about 640° C and leave it at a temperature of about 120° C while the gases of chamber of combustion 10 have a temperature of about 190° C when they are exhausted from cyclones 28, 28'.

Where a tank-type cooler is used for the clinker, as illustrated, wherein the cooling air is passed through the cooler countercurrently to the flow of the clinker, all of the cooling air is used as secondary air for kiln 12 and combustion chamber 10, which reduces the caloric consumption of the installation by about 10 to 12%, compared to conventional installations. If desired, a rotary or grating cooler may be used instead of the tank-type cooler illustrated.

Figure 2:
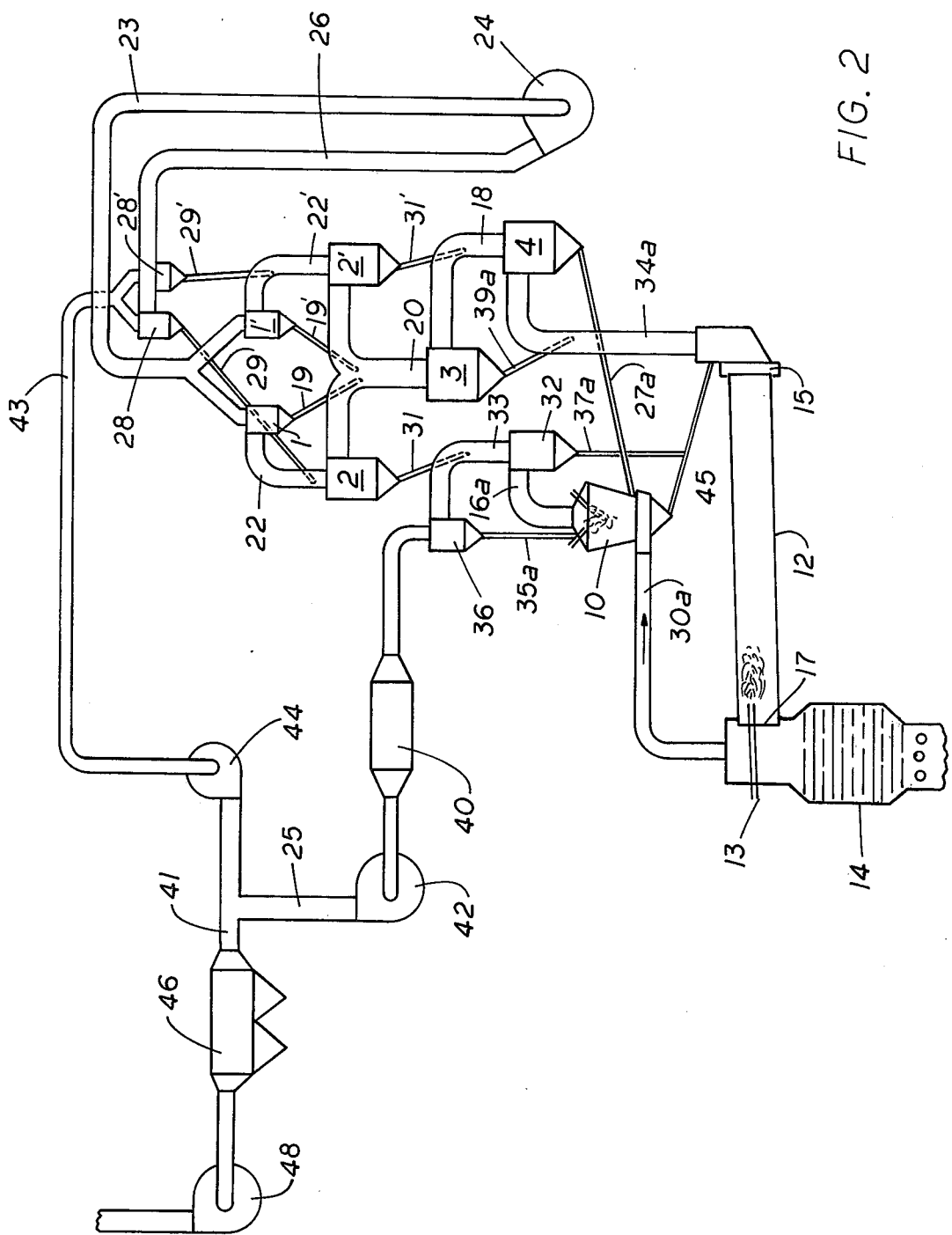

As indicated by the like reference numerals, the embodiment of FIG. 2 is constructed and functions substantially in the same manner as the installation of FIG. 1, with the important exception that the first preheater is traversed by the hot gases removed from kiln 12 while the gases from chamber of combustion 10 flow through the second preheater. As shown, this reversal of the use of the hot gases for the preheaters is obtained by connecting flue 34a, through which the hot gases are removed from the kiln, to cyclone 4 of the first preheater while flue 16a connects chamber 10 to cyclone 32 of the second preheater. Also in contrast to the embodiment of FIG. 1, raw material from cyclone 36 of the second preheater is delivered into combustion chamber 10 by conduit 35a while conduit 37a delivers raw material from cyclone 32 of the second preheater to the kiln through conduit 45.

Conduit 27a delivers raw material from cyclone 4 of the first preheater into the combustion chamber.

When no raw material is supplied to drier 40, particularly during the periods when the material is crushed, it may be used as a cooling chamber. For this purpose, the drier may be provided with water atomizing nozzles to lower the temperature of the gases coming from cyclone 36.

Figure 3:
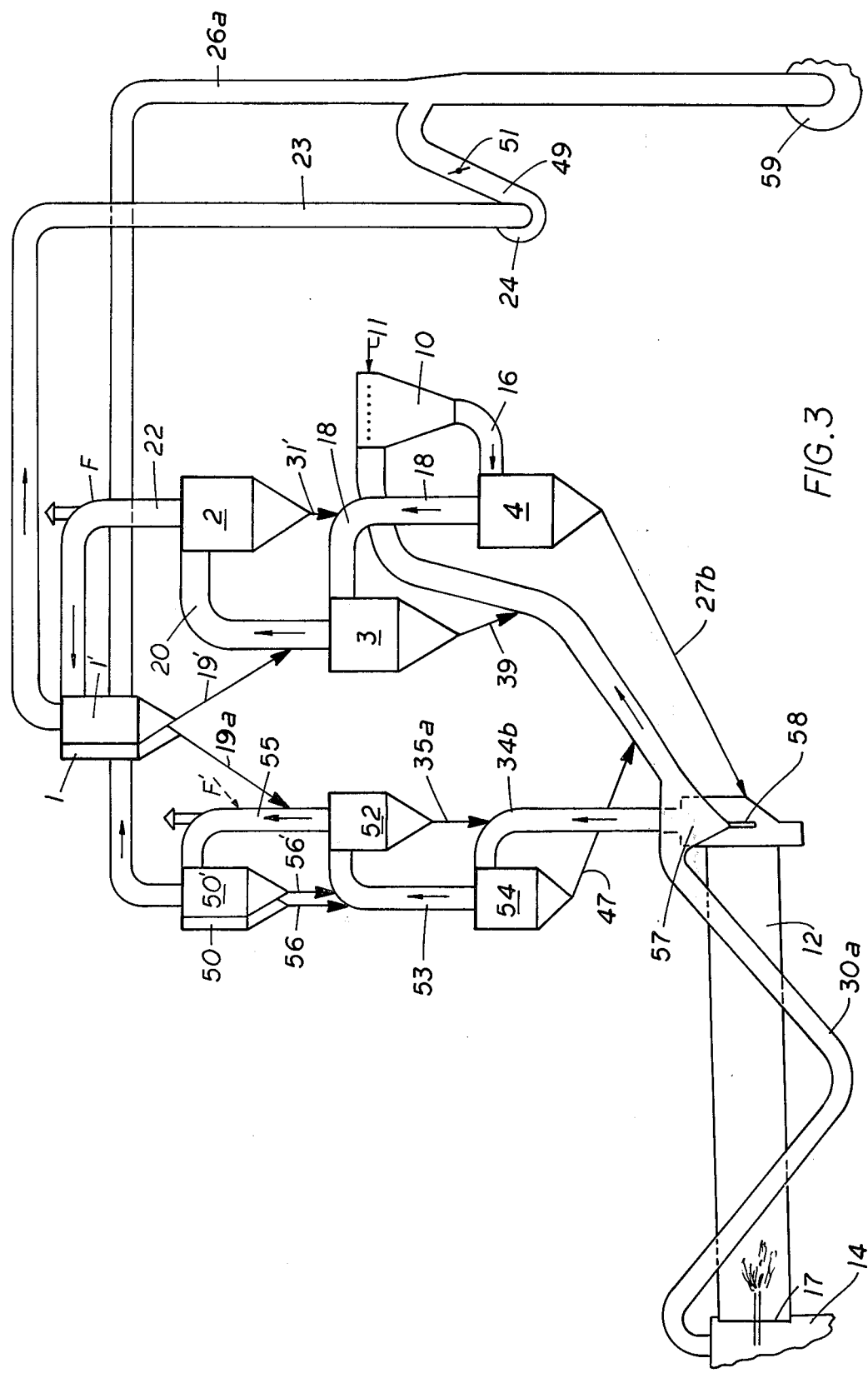

In the embodiment of FIG. 3, flue 16 connects fourth-stage cyclone 4 of the first preheater to chamber of combustion 10 so that the hot combustion gases coming therefrom pass through the cyclones of the first preheater. However, the second stage of the first preheater comprises only a single cyclone 2. Secondary air is passed from cooler 14 into the combustion chamber through flue 30a. Exhaust flue 23 connects first-stage twin cyclones 1, 1' of the first preheater to the suction input of ventilator 24 which sucks the combustion gases through the first preheater in the manner described in connection with FIG. 1, all parts designated by like reference numerals functioning in this embodiment in a like manner as in FIG. 1.

The second preheater of this embodiment has three stages, the first stage being comprised of twin cyclones 50, 50' while the second and third stages are each comprised of single cyclone 52 and 54, respectively. Flue 34b connects the top of the smokestack of kiln 12 to third-stage cyclone 54 so that the second preheater is fed by the hot gases from the kiln which are sucked through the cyclones of the second preheater by ventilator 56 whose suction input is connected to first-stage cyclones 50, 50' by exhaust flue 26a, the gases flowing through flues 53 and 55 which interconnect the cyclones. The pressure output of ventilator 24 is connected to flue 26a by connecting conduit 49, the gas flow therethrough being regulated by adjustable valve 51.

The raw material is fed into flue 22 where it is entrained by the gas flowing from cyclone 2 into twin cyclones 1, 1' of the first preheater. A fraction, generally half, of the raw material will be delivered into cyclone 1 and the other fraction into cyclone 1' where these raw material fractions are separated from the gases. The separated gases are exhausted through flue 23 while the separated raw material fractions are delivered through conduits 19a and 19' into flue 20 of the first preheater and flue 55 of the second preheater, respectively. The first raw material fraction then passes through cyclones 2 and 3 and into flue 18 of the first preheater and flue 30a supplying secondary air to combustion chamber 10. The second raw material fraction is carried by the gases flowing through flue 55 into cyclones 50, 50' of the second preheater whence it flows through conduits 56, 56' and 35a into flues 53 and 34b, respectively, to be entrained into cyclones 52 and 54 of the second preheater before the preheated second raw material fraction is delivered into flue 30a by conduit 47. Thus, all of the preheated raw material is delivered into combustion chamber 10 after it has passed through the second preheater and the first three stages of the first preheater and after it passes through the combustion chamber, the preheated raw material is delivered into fourth-stage cyclone 4 of the first preheater whence it passes through conduit 27b into the kiln.

Secondary air flue 30a has a funnel 57 intermediate its ends and this funnel is in communication with the smokestack of kiln 12 by means of tube 58 to recover grains of material which are too large to be entrained by the secondary air stream in flue 30a. At the start-up of the installation, raw material may be fed into the delivery circuit at F' and only ventilator 56 is operated so that the raw material is preheated only in the second preheater before being fed into flue 30a.

All the gases exhausted by ventilator 56 are delivered either to a crusher-drier at low temperature or are passed through a reconditioning circuit.

The installation of FIG. 3 may, for example, be operated under the following conditions:

Temperature of the gases at the gas outlets of twin cyclones 1, 1': 300° C.

Gas pressure at the outlets of these cyclones: 700 mm water below atmospheric pressure.

Temperature of the gases at the gas outlets of twin cyclones 50, 50': 450° C.

Gas pressure at the outlets of these cyclones: 400 mm water below atmospheric pressure.

At ventilator 24, the gases have a temperature of 300° C and the ventilator will reduce the pressure to 300 mm b.a.p. while ventilator 56 receives the gases at a temperature of about 350° C and works at a pressure below 400 mm.

Figure 4:
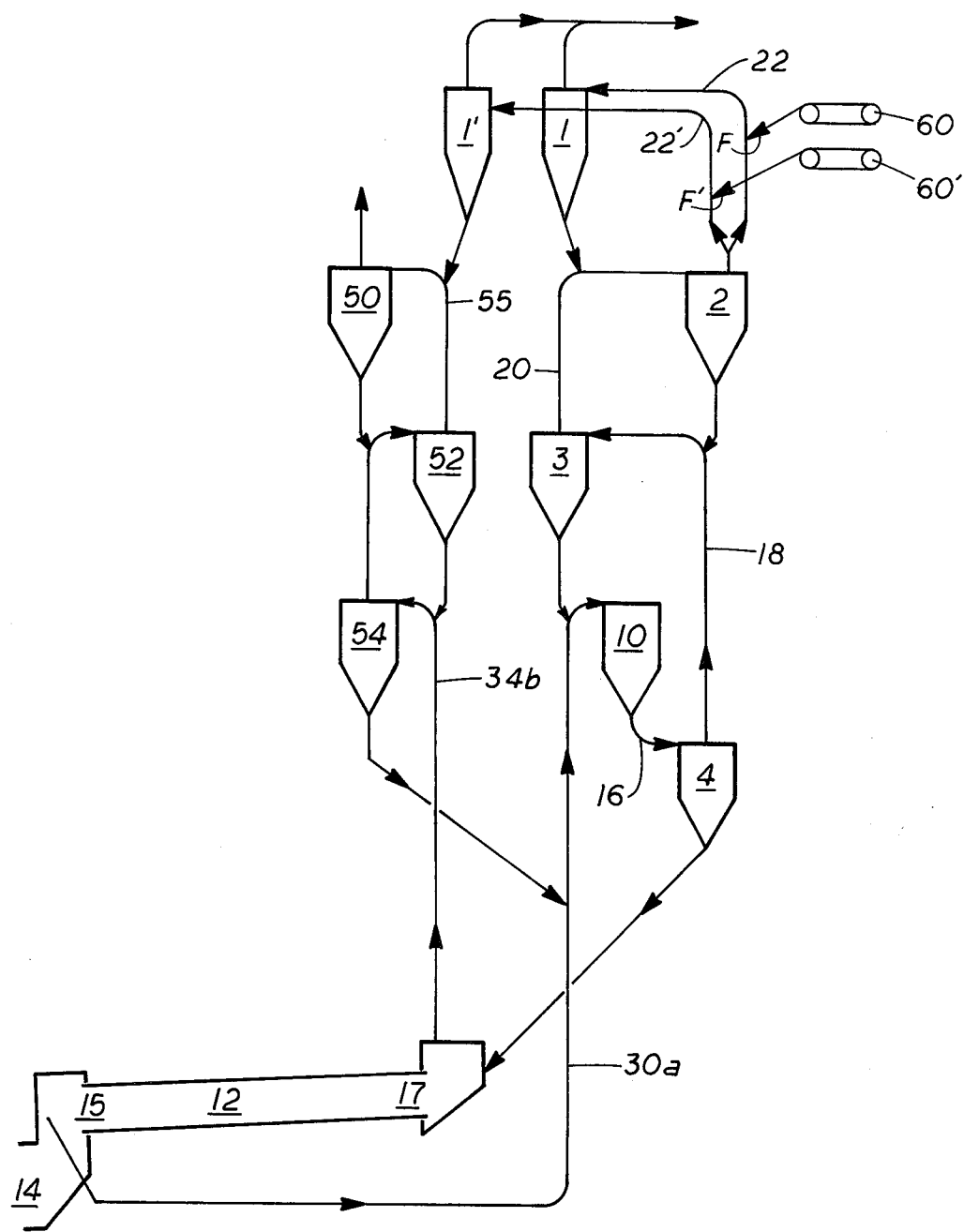

The installation of FIG. 4 differs from that of FIG. 3 solely by the manner in which the raw material is fed to the preheaters. As in the embodiment of FIG. 3, the flue leading from the gas outlet of second-stage cyclone 2 of the first preheater has branches 22, 22' connected to the twin cyclones of the first stage. However, while the inlet F for feeding the raw material leads into flue 22 upstream of its bifurcation in the installation of FIG. 3, raw material inlets F and F' are mounted in branches 22 and 22' in the embodiment of FIG. 4. The amounts of raw material introduced through the inlets into the raw material delivery circuit are controlled by dosing devices 60 and 60' so as to optimize the operation of the installation, for instance with respect to optimum drying of the raw material or maximum recovery of energy.

In case the average amounts of raw material introduced through inlets F and F' differ significantly, twin cyclones 1, 1' and flue branches 22, 22' must be so dimensioned that the throughput of hot gases produces optimal heat exchange with the raw material fractions introduced therein. It is also possible to dispose more than two cyclones in parallel in the first stage, for example three cyclones if the ratio between the amounts of raw material introduced at F and F' is about 1 : 2, the branch were the larger amount of raw material is introduced being associated with two of the cyclones while the other branch leads to the third cyclone.

Figure 5:
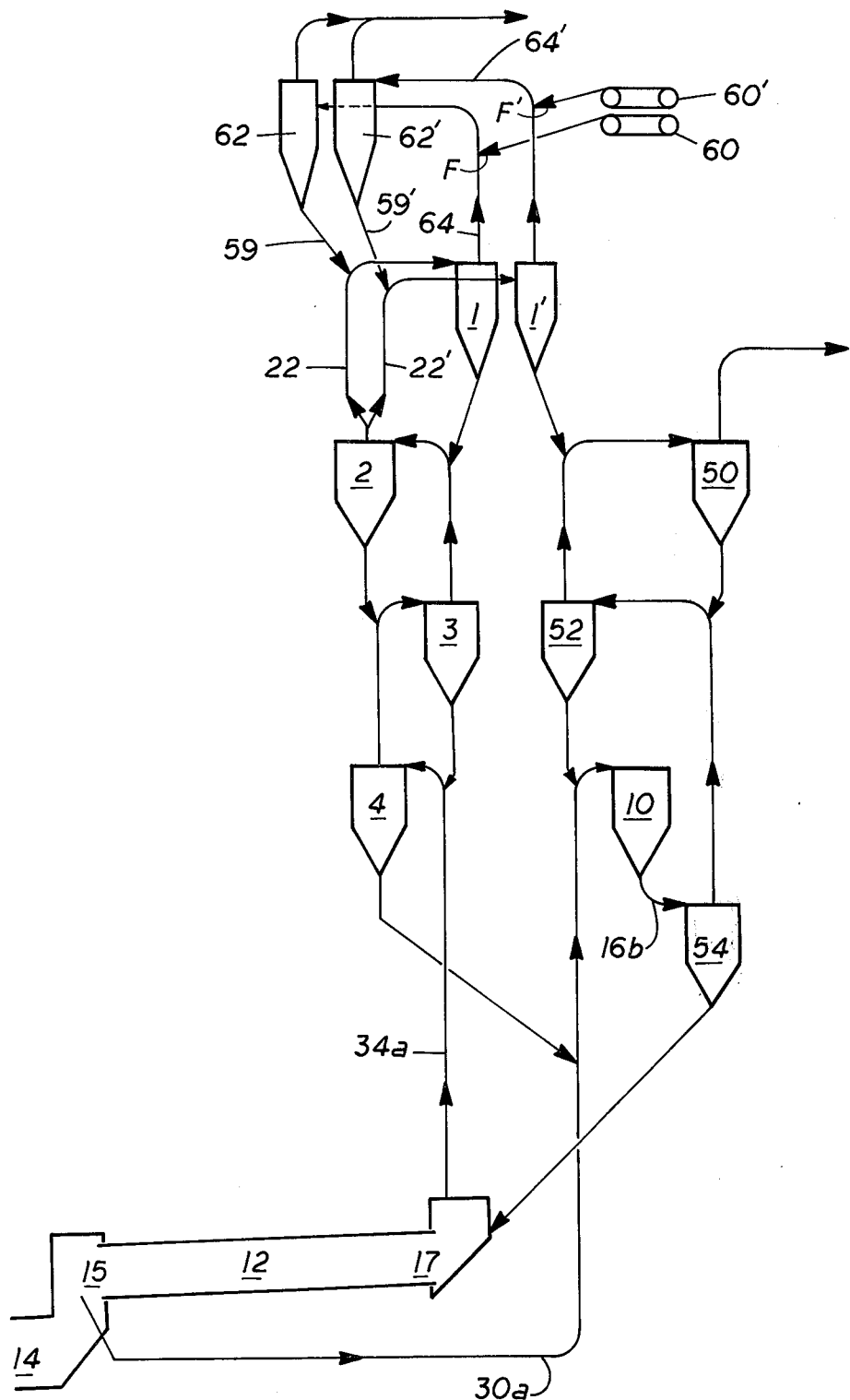

The installation of FIG. 5 is like that of FIG. 4, except for the following differences:

The feeding of the hot gases to the two preheaters is reversed, i.e. the first preheater receives the hot gases from the kiln through flue 34a while the second preheater receives the combustion gases from chamber 10 through flue 16b. Furthermore, a supplemental stage consisting of twin cyclones 62, 62' is provided for the first preheater, this supplemental stage being connected to twin cyclones 1, 1' of the first stage by flues 64, 64', fractions of the raw material being fed into the latter flues at F and F'. Conduits 59, 59' deliver the raw material separated in twin cyclones 62, 62' into branch flues 22, 22' leading to first-stage cyclones 1, 1'. As in the installation of FIG. 4, the cyclones of the supplemental and first stages of the first preheater, as well as the flues connecting them, are dimensioned in accordance with the material throughput.

What is claimed is:

1. An installation for the manufacture of cement from dry raw material, comprising
 a. a rotary tubular kiln having
   1. an inlet for the material,
   2. means for producing hot gases in the kiln for converting the material into clinker,
   3. an outlet for the clinker, and 4. flue means for removing the hot gases from the kiln,
b. a chamber of combustion disposed upstream of the kiln inlet, the combustion chamber having
   1. means for producing combustion gases in the chamber, and
   2. flue means for removing the combustion gases from the chamber,
c. first and second preheaters for the raw material,
   1. said first preheater being a multi-stage preheater, and flues interconnecting the stages of the first preheater,
   2. means for introducing all of the raw material into a first stage of said first preheater, for heating therein,
   3. one of the stages of the first preheater being arranged to divide the heated material into two fractions,
   4. conduit means passing one of the material fractions sequentially into the second preheater and into the chamber of combustion and passing the other material fraction sequentially into successive ones of the stages of the first preheater and into the chamber of combustion,
   5. one of said preheaters being in communication with the flue means for removing the hot gases from the kiln whereby the hot gases pass through said one preheater for heating the material therein, and
   6. the other one of said preheaters being in communication with the flue means for removing the combustion gases from the combustion chamber whereby the combustion gases pass through said other preheater for heating the material therein, and
d. a cooler receiving the clinker from the outlet of the kiln.

2. The installation of claim 1, further comprising a drier for the raw material and flue means for conducting the combustion gases from the second preheater to the drier.

3. The installation of claim 1, further comprising flue means for exhausting the hot gases from the first preheater, all of the raw material being introduced into the latter flue means means for moving the exhausted hot gases in the latter flue means to entrain the raw material, and means for separating the raw material from the hot gases and for introducing the raw material into the first preheater.

4. The installation of claim 1, further comprising a first ventilator having a suction input and a pressure output, a flue means connecting the first preheater to the suction input of the first ventilator for sucking the gases from the first preheater and exhausting them at the pressure output of the first ventilator, another flue means exhausting the gases from the second preheater, the pressure output of the first ventilator being in communication with the other flue means for feeding the exhausted gases from the first preheater into the other flue means where they are mixed with the gases exhausted from the second preheater, and a second ventilator having a suction input in communication with the other flue means for receiving all of the exhausted gases.

5. The installation of claim 1, further comprising a flue removing air from the cooler, the air being heated by contact with the clinker in the cooler, and delivering the removed heated air as secondary air to the chamber of combustion.

6. The installation of claim 1, wherein any stage of the first preheater upstream of the stage where the raw material is divided into two fractions is arranged as a twin stage forming two independent circuits for the gases and the raw material, each of the independent circuits receives a fraction of the raw material introduced into the first preheater, and further comprising dosing means for regulating the amounts of raw material received in each of the independent circuits, the raw material fraction from one of the independent circuits being introduced into the subsequent stages of the first preheater and the other raw material fraction being introduced into the second preheater.

* * * * *